Figure 1:
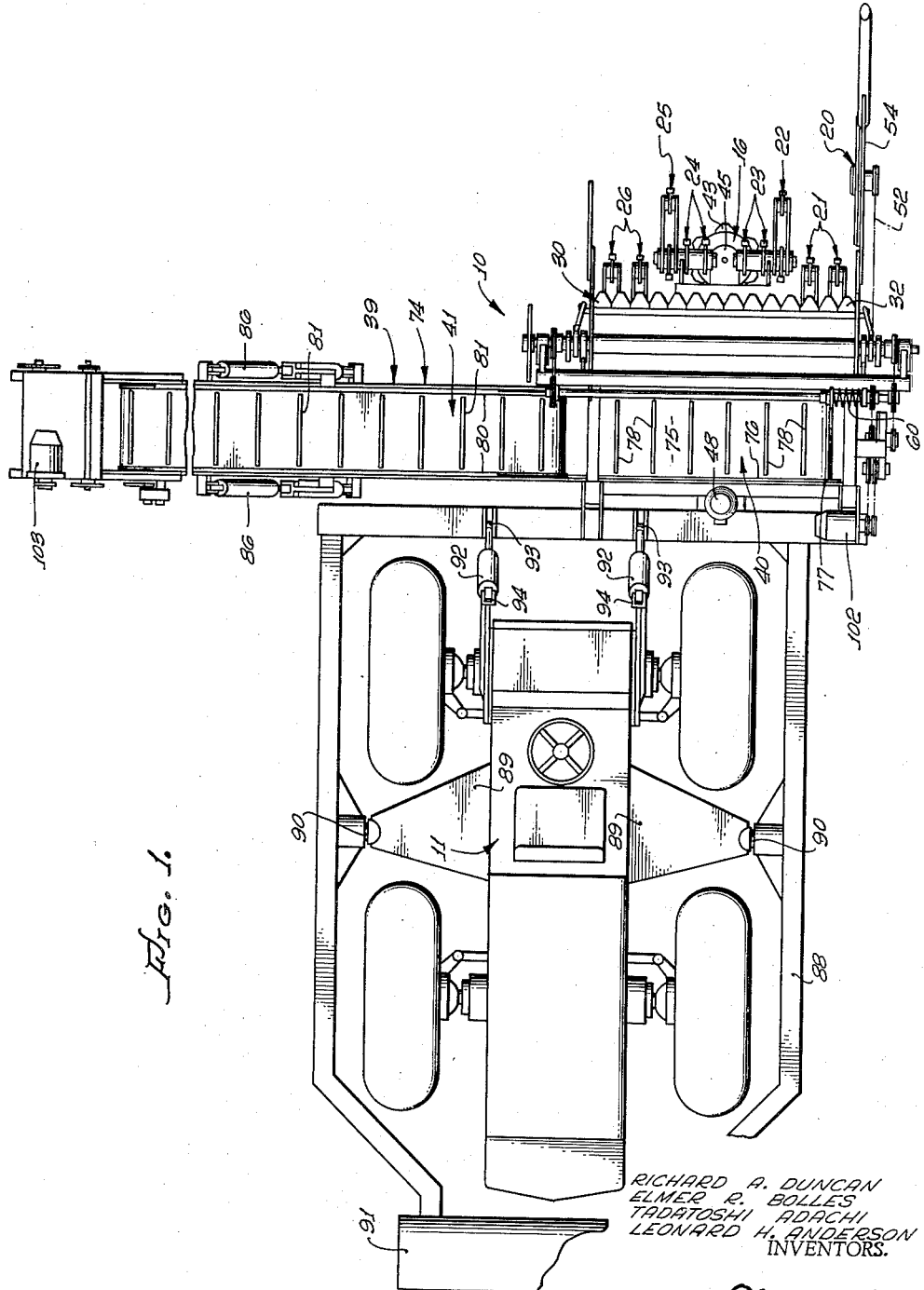

RICHARD A. DUNCAN
ELMER R. BOLLES
TADATOSHI ADACHI
LEONARD H. ANDERSON
INVENTORS.

BY

ATTORNEYS.

Sept. 10, 1963

R. A. DUNCAN ETAL 3,103,091

SUGAR CANE HARVESTER

Filed March 27, 1961

6 Sheets-Sheet 5

RICHARD A. DUNCAN
ELMER R. BOLLES
TADATOSHI ADACHI
LEONARD H. ANDERSON
INVENTORS.

BY

ATTORNEYS.

RICHARD A. DUNCAN
ELMER R. BOLLES
TADATOSHI ADACHI
LEONARD H. ANDERSON
INVENTORS.

BY

*Lyon+Lyon*

ATTORNEYS.

3,103,091
SUGAR CANE HARVESTER

Richard A. Duncan, Elmer R. Bolles, Tadatoshi Adachi, and Leonard H. Anderson, all of Honolulu, Hawaii, assignors to Hawaiian Development Company, Ltd., Honolulu, Hawaii, a corporation of Hawaii
Filed Mar. 27, 1961, Ser. No. 98,361
4 Claims. (Cl. 56—16)

This invention relates to apparatus for harvesting sugar cane and is directed to improvements over the devices disclosed in the Duncan Patent 2,724,228, and Duncan et al. Patent No. 2,808,865.

The principal object of this invention is to provide sugar cane harvesting apparatus which cuts the sugar cane stalks into short segments immediately upon severing the cane and lifting it from the ground.

It is another object of this invention to provide a cut-load harvester particularly adapted for harvesting sugar cane and similar crops which lie in a tangled and recumbent condition on the ground as well as cane stalks which stand in various degrees of erectness.

Another object of this invention is to provide such a device which will harvest sugar cane which has been grown in irrigated fields and which has stalks which lie recumbent in irrigation furrows at the time of harvest, and which device will also harvest sugar cane which has not been irrigated and whose stalks do not lie in furrows but are inclined in a tangled mat on relatively flat ground.

Other and more detailed objects and advantages of this invention will appear hereinafter.

Figure 2:
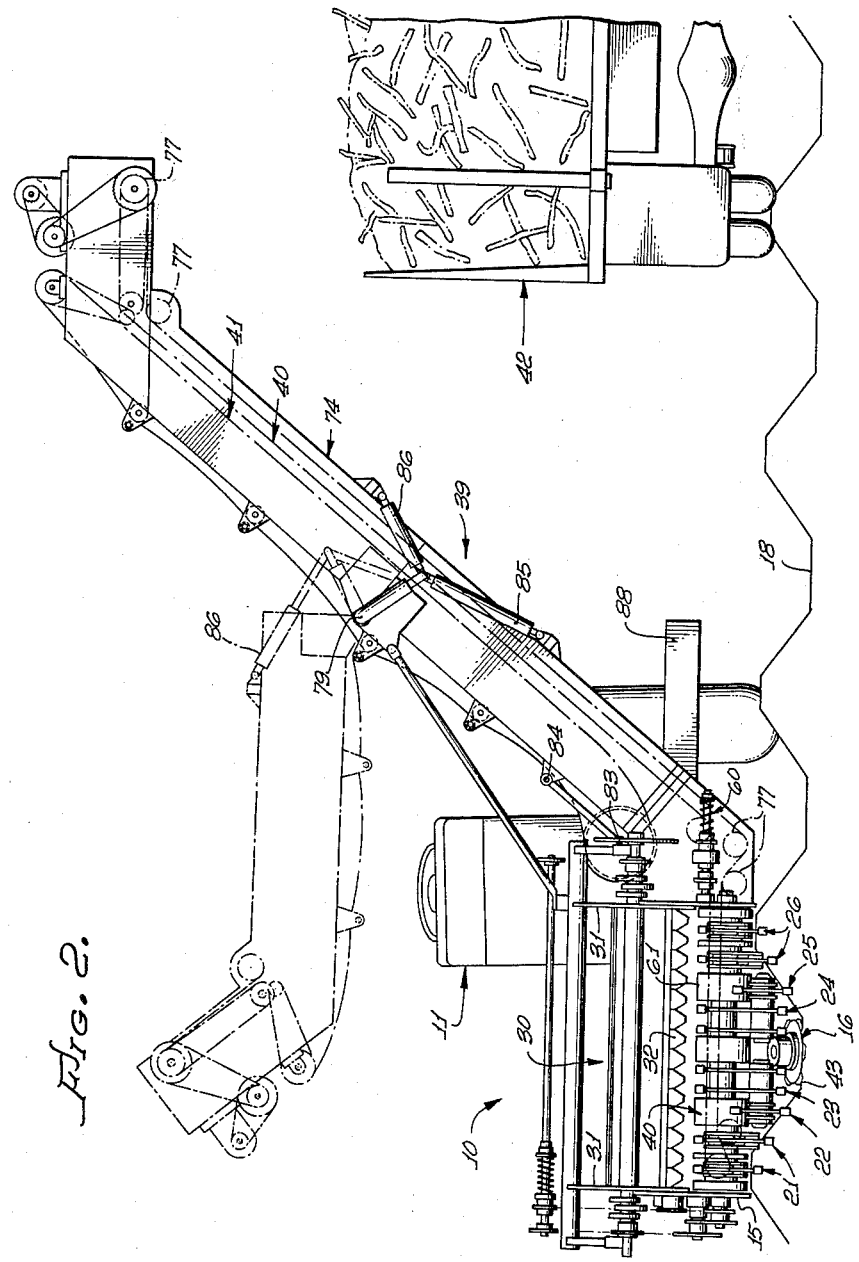
Figure 3:
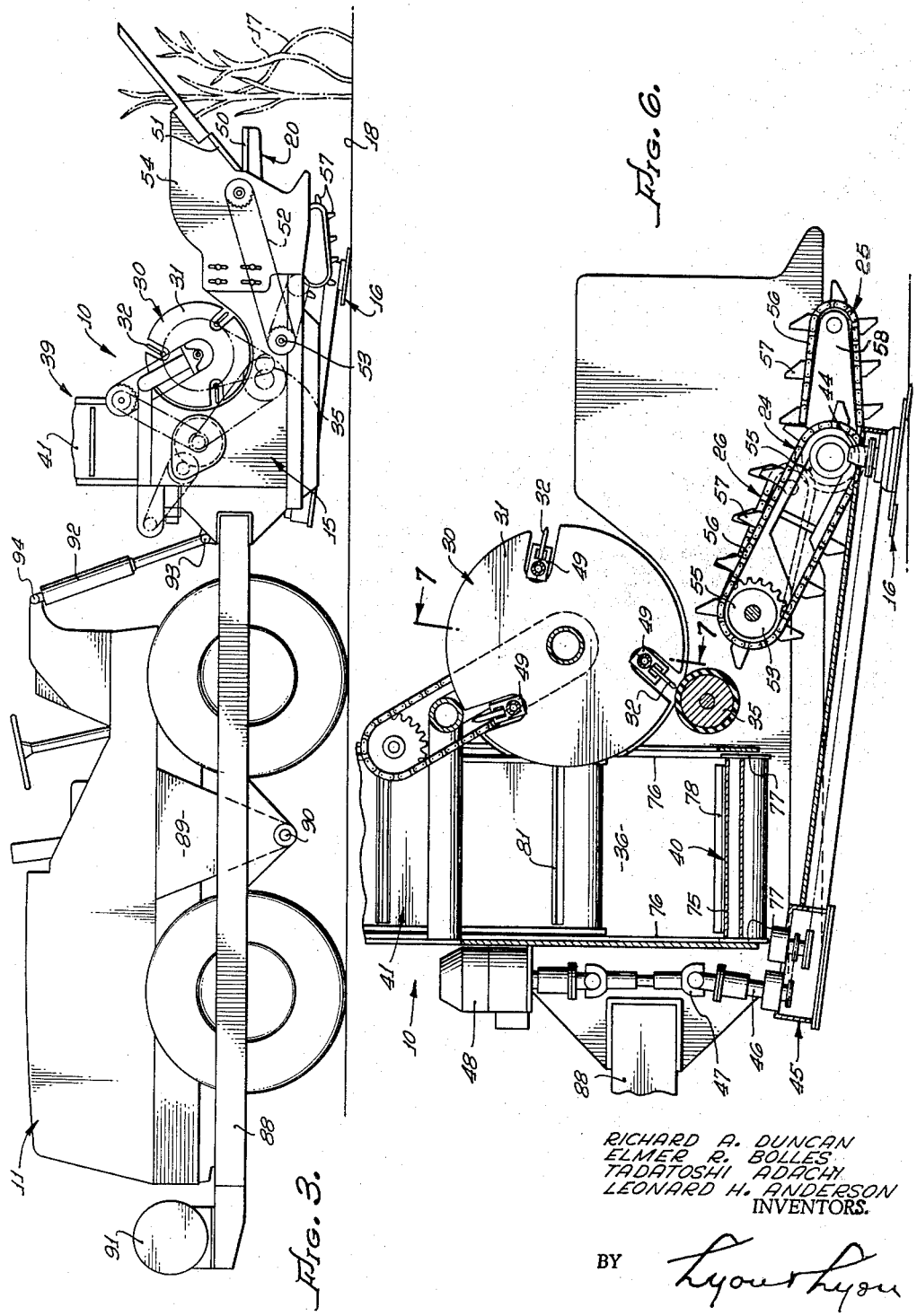
Figure 4:
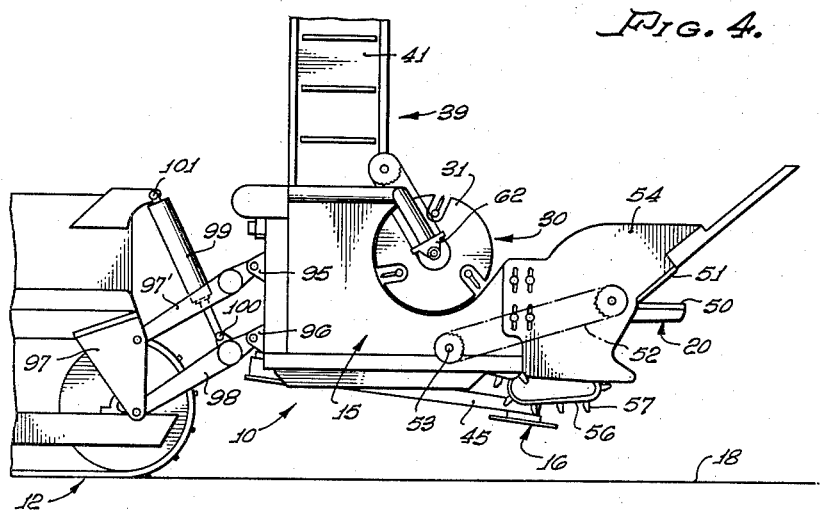
Figure 10:
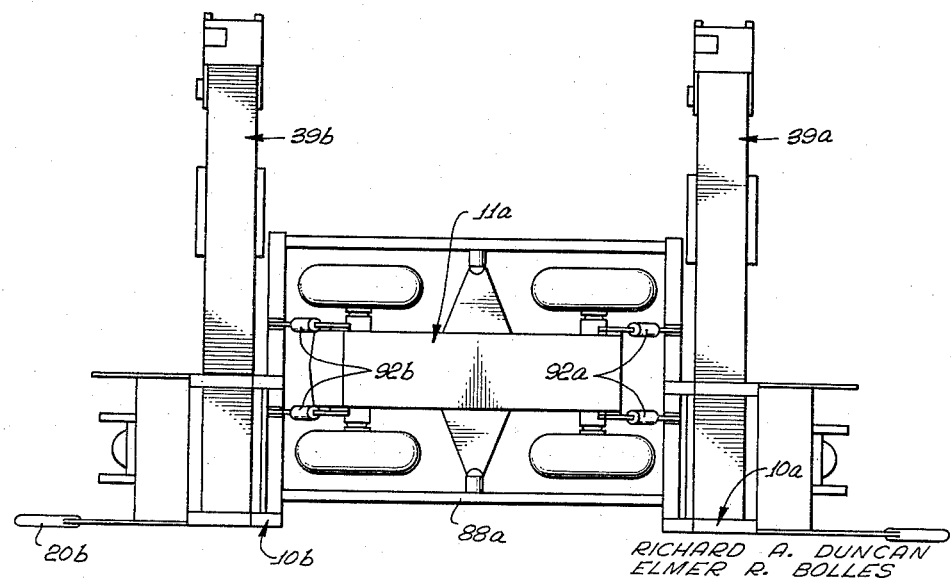
Figure 5:
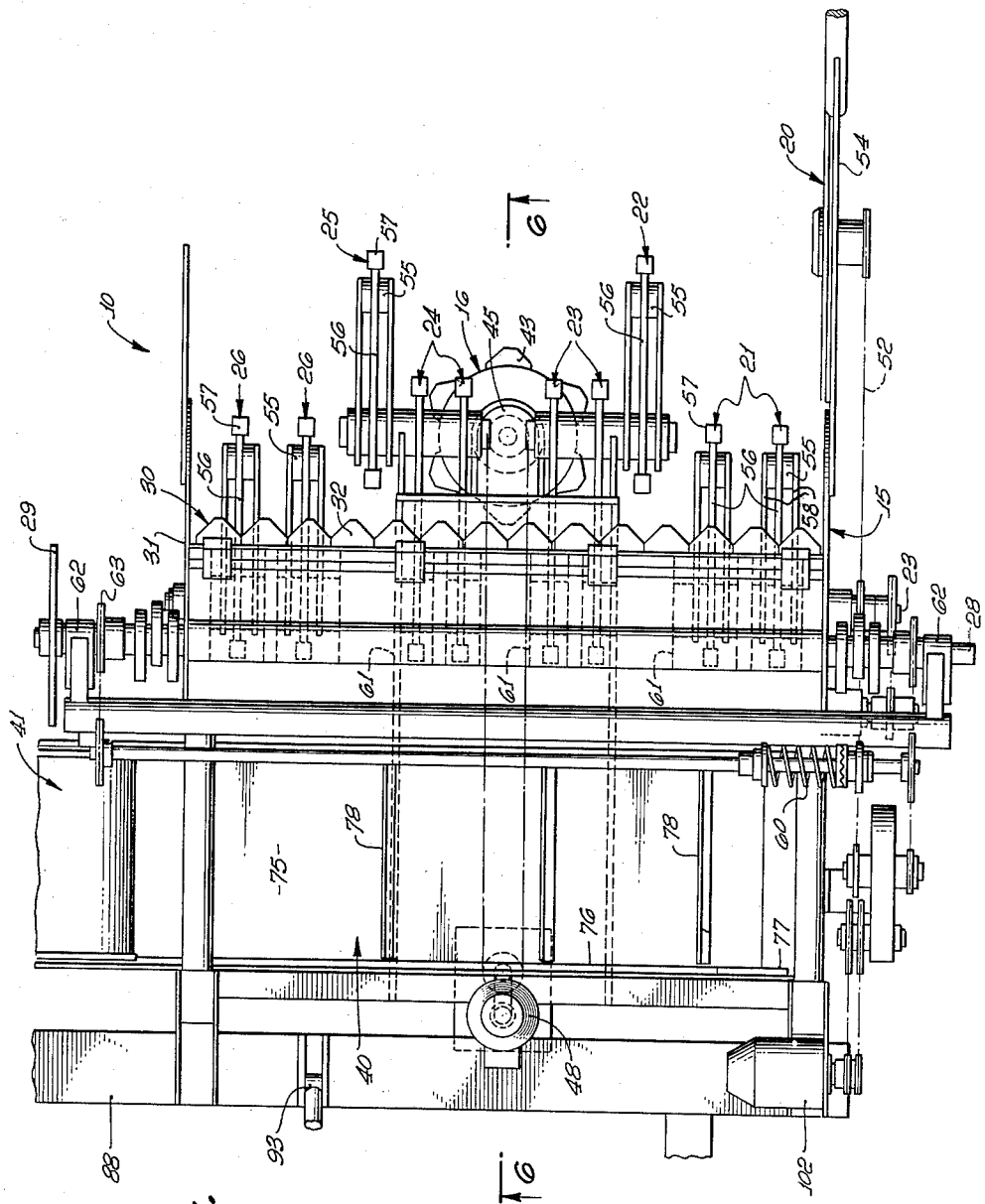
Figure 7:
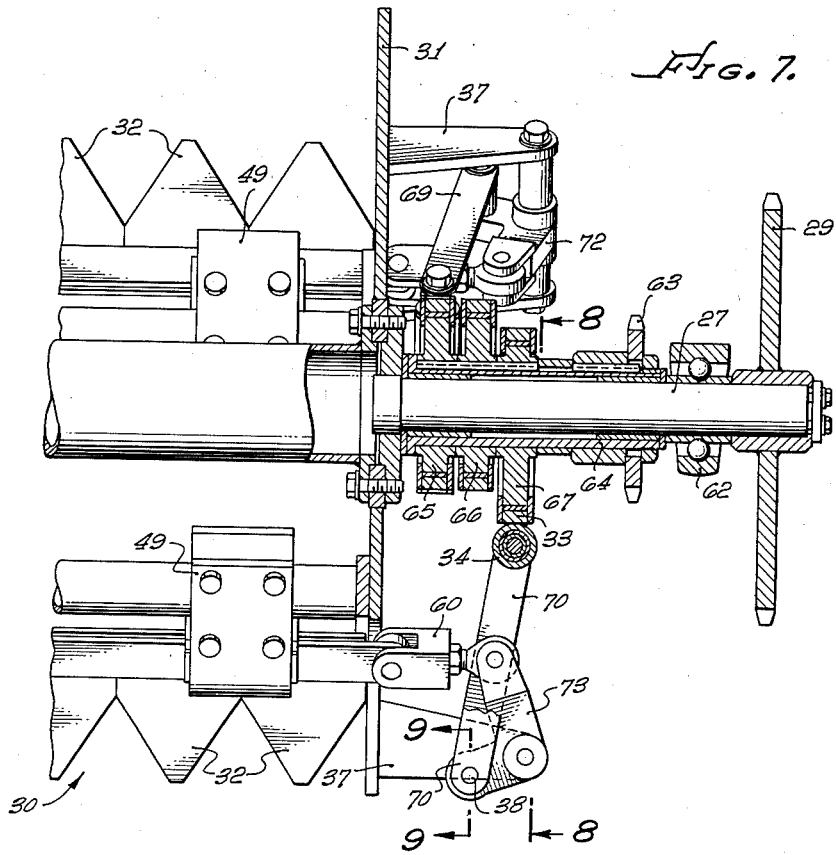
Figure 8:
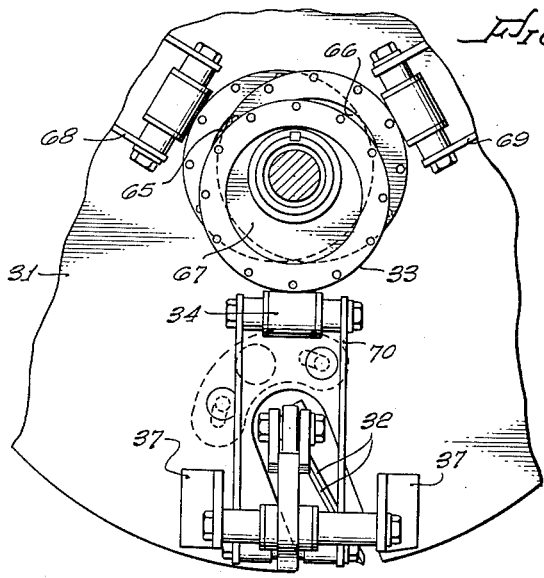
Figure 9:
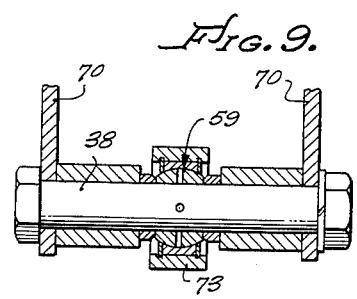

In the drawings:

FIG. 1 is a top plan view showing a preferred embodiment of this invention. FIG. 2 is a front elevation thereof. FIG. 3 is a side elevation showing the device in harvesting position. FIG. 4 is a view similar to FIG. 3 showing the harvester device in raised (inoperative) position. FIGURE 5 is a top plan view of a portion of the device shown in FIG. 1. FIG. 6 is a sectional side elevation taken substantially on the lines 6—6 as shown on FIG. 5. FIG. 7 is a sectional view taken substantially on the lines 7—7 as shown on FIG. 6. FIG. 8 is a sectional view, partly broken way, taken substantially on the lines 8—8 as shown on FIG. 7. FIG. 9 is a sectional detail taken substantially on lines 9—9 as shown on FIG. 7. FIG. 10 is a plan view showing a modification.

Referring to the drawings, the harvester device 10 is a self-contained unit which may be supported at the forward end of a self-powered vehicle such as a wheel-type or track-type tractor. The wheel-type tractor 11 is preferred for harvesting cane grown in irrigated furrows and the track-type tractor 12 (see FIGURE 4) is preferred for unirrigated cane grown on relatively flat ground. The harvester device 10 includes a frame 15 which supports a rotary ground knife 16 for cutting the cane stalks 17 away from the roots or "stool" at or near the ground line 18. A rotary side-trimming knife 20 is mounted on the frame 15 for parting the sugar cane between the row being harvested and the adjacent row. A plurality of pick-up devices 21, 22, 23, 24, 25 and 26 are mounted on both sides of the ground knife 16 for lifting the tangled mat of cane stalks off the ground immediately following severance by the ground knife 16. A cross-flow cutter device, generally designated 30, is mounted closely adjacent the ground knife 16 and the pick-up devices 21–26 for cutting the sugar cane stalks into short segments. The cutter device 30 includes a rotary reel member 31 having pairs of cooperating sickle blades 32 which reciprocate in a transverse direction while the member 31 rotates. These sickle blades cooperate with a rubber covered back-up roll 35 mounted to turn on the frame 15 for cutting the tangled mat of sugar cane stalks. The short segments of sugar cane are received in a hopper 36 within the frame 15 and adjacent the cutter device 30. A transverse inclined side-delivery conveyor, generally designated 39, is mounted on the frame 15 and carries the short segments of sugar cane from the hopper 36 up a steep incline for direct and continuous discharge into a suitable transport truck 42 moving alongside and parallel to the harvester 10. An advantage of this construction is that the inclined conveyor 39 may be narrow in width since it handles only segmented cane stalks rather than the full length stalks prior to segmentizing. Accordingly, the conveyor parts may be smaller and lighter. In order to convey the short segments of sugar cane up the steeply inclined conveyor belt 40 without cane roll back, a hugger belt 41 is arranged to drape against the conveyed cane segments and to travel at the same rate of speed as the belt 40.

The ground knife 16 comprises a circular disc with cutting blades 43 fixed to its periphery. The disc is attached to a rotary hub 44 which is chain driven through a speed reducing gear box 45, a drive shaft 46, a universal joint 47 and a fluid motor 48. The ground knife 16 operates at relatively high speed, for example, about 500 r.p.m., in order to insure free-cutting action.

The side trimming knife assembly 20 comprises a rotating element having a plurality of blades 50 which cut against a stationary cutter bar 51. This knife turns at a slower speed, for example, 75 r.p.m. It is mounted on a hub driven by chain 52 from the pick-up roll 53. The knife assembly is carried on a plate frame 54 which is adjustably mounted on the main frame 15 of the harvester. The adjustment allows the knife assembly to be positioned to suit the furrow ridge height.

The pick-up devices 21–26 comprise sprockets 55 and endless chains 56 having lugs 57 connected to the chain links. These pick-up devices each have spacer bars 58 pivoted at the driving end and are adjustable by means (not shown) about the pivotal mounting to suit the furrow contour. The pick-up roll 53 serves to drive the pick-up devices 21–26. The spaces on the pick-up roll between the chain-driving sprockets 55 are filled with cylindrical spacers 61 and the purpose of these spacers is to fill in the gaps between the pick-up roll 53 and the back-up roll 35. The back-up roll is a rubber covered roll which serves to "back up" the sugar cane stalks against the cutting thrust of the revolving and reciprocating sickle blades 32. The rubber surface permits actual contact of the reciprocating sickle blade tips with the back-up roll without damage to either the back-up roll or the tips.

The cutter device 30 includes a reel member 31 having stub shafts 27 and 28 mounted to turn in bearings 62 carried on the frame 15. Sprocket 29 drives stub shaft 27 and reel 31. A sprocket 63 turns a sleeve 64 on stub shaft 27, and on this sleeve are mounted three eccentrics, 65, 66 and 67. A ring 33 encircles each of the eccentrics and each is secured respectively to a cross sleeve 34. The connecting links 68, 69 and 70, are pivotally connected to the cross sleeves at their inner ends and are pivotally attached to bell cranks 71, 72 and 73 at their outer ends. Each bell crank is pivotally supported on the reel 31 by means of brackets 37 and a pivot shaft 38. A self-aligning bearing assembly 59 is provided for mounting each bell crank on its respective pivot shaft 38. A clevis assembly 60 connects each bell crank to one of the sickle bars 32 and these are slidably carried by support mechanism 49 mounted on the reel 31. Each bell crank is thus connected to reciprocate one of a pair of cooperating sickle blades 32 while a similar bell crank on the opposite end of the reel member 31 is connected to reciprocate the other sickle blade of the pair. The sickle blades on each pair move simultaneously in opposite directions, and in this way, inertia forces in the reciprocating sickle blades 31 are balanced out by symmetry of motion and equal weight of each sickle blade.

The transverse inclined side-delivery conveyor 39 includes a mast 74 and the conveyor belt 40 supported to travel thereon. A portion 75 of the belt 40 runs through the bottom of the hopper 35. Each side edge of the belt 40 is attached to a length of chain 76 which is constrained to run over sprockets 77 in an endless fashion. The belt 40 is equipped with cross flights 78 and the vertical edge of each cross flight is serrated to give traction against the conveyed sugar cane segments. The hugger belt 41 is of similar construction with side chains 80 and cross flights 81 with serrated edges. The tail shaft 83 is hinged to pivot around the axis 84 for the purpose of floating the tail shaft 83 to accommodate uneven flow of cane segments up the conveyor 39. The conveyor mast 74 may be folded around the pivot axis 79 to facilitate transportation of the harvester 10 between cane fields. Folding and extension of the mast 74 is accomplished by means of two sets of hydraulic cylinders 85 and 86.

Slip clutches 60 are provided in the power transmission connections in order to prevent damage to the mechanism in the event that one or more rotary or moving parts should become jammed in operation.

When the harvester assembly 10 is to be carried by a wheel type tractor 11, the frame 15 is bolted to a carrier 88 which is pivotally mounted on the tractor 11 by means of brackets 89 and pivot pins 90. A counterweight 91 of the carrier 88 balances the weight of the harvester 10. Hydraulic cylinder assemblies 92 are connected at 93 to the carrier 88 and to the frame of the tractor at 94. The hydraulic cylinder assemblies 92 work in unison to tilt the carrier 88 and harvester 10 about the pivot pins 90. This action controls the raising and lowering movement of the harvester 15 and controls the clearance of the rotary ground knife 16 with respect to the ground line 18. A suitable control system for operating the hydraulic cylinder assemblies 92 is provided.

A modified form of support for the harvester 10 is shown in FIG. 4. Pairs of brackets 95 and 96 are mounted on the frame 15 of the harvester and brackets 97 are provided on the track-laying tractor 12. Pairs of links 97' and 98 are connected to the brackets 95, 96 and 97 in a manner so that their pivot points form a parallelogram. Hydraulic cylinder assemblies 99 are connected at 100 to the links 98 and to the frame of the tractor at 101. The hydraulic cylinder assemblies 99 operate in the manner described above in connection with hydraulic cylinder assemblies 92 to raise and lower the harvester 10 and to control the height of the rotary ground knife 16 with respect to the ground line 18.

In operation, the cane harvester 10 is mounted on a wheel type tractor 11 or a track-laying tractor 12 and is driven to the cane field with the mast 74 in folded position as shown in phantom lines in FIG. 2. The mast is then moved to the full line extended position by means of the pairs of hydraulic cylinder 85 and 86. A hydraulic pump (not shown) driven from the tractor engine operates a plurality of hydraulic motors 48, 102, 103 on the harvester 10 and these serve to drive the rotary ground knife 16, the side knife 20, the pick-up devices 21–26, the cross-flow cutter assembly 30, the conveyor belt 40 and the hugger belt 41. A transport truck 42 is driven along the field under the discharge end of the conveyor 39 to receive segmented cane stalks. A driver seated on the tractor 11 (or tractor 12) controls the operation of the tractor and the harvester 10. The tractor is driven forward causing the side knife 20 to sever the tangled mat of cane along the right hand side of the harvester 10.

The ground knife 16 cuts the cane stalks near the ground line 18 and the chain and sprocket pick-up devices 21–26 lift the tangled mat from the ground and move it into the cross-flow cutter 30. The three pairs of reciprocating sickle blades 32 on the rotating reel 31 cooperate with the rubber covered back-up roller 35 to cut the mat of cane stalks into relatively short-length segments of sugar cane. These are discharged into the hopper 36 onto the portion 75 of the conveyor belt 39 which runs through the bottom of the hopper. The segmented cane stalks then move along the steeply inclined portion of the conveyor 39 and are prevented from tumbling back into the hopper by means of the hugger belt 41 which operates at the same rate of speed as the conveyor belt 40.

The harvester described above cuts and harvests one row of sugar cane and then backs up in deadhead fashion for the full length of the cut row, in order to repeat the cutting and harvesting cycle on the next adjacent row. In the modified form of this invention shown in FIG. 10, a single tractor 11a carries a left-hand cane harvester 10a at one end and a right-hand cane harvester 10b at the other end. The harvester 10a is the same as that previously described. The harvester 10b is similar but has the inclined conveyor 39b mounted on the right side and the side-cutting knife assembly 20b mounted on the left side. The pivoted carrier 88a supports both harvesters 10a and 10b. No counterweight is required since one harvester balances the other. Pairs of hydraulic cylinders 92a and 92b control the operating height of the harvester as described above. In this two-way harvester sugar cane is cut and harvested in both directions of travel and deadheading is eliminated.

Having fully described our invention, it is to be understood that we are not to be limited to the details herein set forth, but that our invention is of the full scope of the appended claims.

We claim:

1. For use with a self-propelled vehicle, a sugar cane harvesting machine comprising in combination: a mobile frame having a hopper, lift means extending rearwardly from the rear of said frame supporting the entire harvesting machine forwardly of said vehicle, a rotary ground knife carried on the frame for severing cane stalks from the ground, means on the frame for driving said ground knife, said means including power transmission connections extending under said hopper, means on opposite sides of the ground knife for lifting the severed cane from the ground, and cutter means on the frame adjacent the ground knife for cutting the severed cane stalks into short lengths and discharging them into said hopper.

2. For use with a self-propelled vehicle, a sugar cane harvesting machine comprising in combination: a mobile frame having a hopper, lift means extending rearwardly from the rear of said frame supporting the entire harvester machine forwardly of said vehicle, a rotary ground knife carried on the frame for severing cane stalks from the ground, means on the frame for driving said ground knife, said means including power transmission connections extending under said hopper, means on opposite sides of the ground knife for lifting the severed cane from the ground, cutter means on the frame adjacent the ground knife for cutting the severed cane stalks into short lengths and discharging them into said hopper, and a transverse inclined conveyor on the frame for elevating said short length cane stalks from said hopper.

3. For use with a self-propelled vehicle, a sugar cane harvesting machine comprising in combination: a mobile frame having a hopper, lift means extending rearwardly from the rear of said frame supporting the entire harvester machine forwardly of said vehicle, a rotary ground knife carried on the frame for severing cane stalks from the ground, means on the frame for driving said ground knife, said means including power transmission connections extending under said hopper, means on opposite sides of the ground knife for lifting the severed cane from the ground, and cutter means on the frame adjacent the ground knife for cutting the severed cane stalks into short lengths and discharging them into said hopper.

4. For use with a self-propelled vehicle, a sugar cane harvesting machine comprising in combination: a mobile frame having a hopper, lift means extending rearwardly from the rear of said frame supporting the entire harvester machine forwardly of said vehicle, a rotary ground knife carried on the frame for severing cane stalks from the ground, means on the frame for driving said ground knife, said means including power transmission connections extending under said hopper, means on opposite sides of the ground knife for lifting the severed cane from the ground, cutter means on the frame adjacent the ground knife, said cutter means including a member rotatably mounted on said frame and having co-operating pairs of transverse sickle blades mounted to reciprocate thereon for cutting the severed cane stalks into short lengths and discharging them into said hopper, and a transverse inclined conveyor on the frame for elevating said short length cane stalks from said hopper.

References Cited in the file of this patent
UNITED STATES PATENTS

| | | |
|---|---|---|
| 2,621,461 | Tiedtke | Dec. 16, 1952 |
| 2,724,228 | Duncan | Nov. 22, 1955 |
| 2,808,865 | Duncan et al. | Oct. 8, 1957 |